Oct. 5, 1954 L. E. ASKE 2,691,124
ELECTRIC MOTOR AND SWITCH
Filed March 12, 1949 4 Sheets-Sheet 1

INVENTOR:-
LEONARD E. ASKE
BY William C. Babcock
ATTORNEY

Oct. 5, 1954  L. E. ASKE  2,691,124
ELECTRIC MOTOR AND SWITCH
Filed March 12, 1949  4 Sheets-Sheet 4

| INTERNAL PERMANENT CONNECTIONS | | | | | |
|---|---|---|---|---|---|
| 2 POLE | | 4 POLE | | 8 POLE | |
| MAIN W | AUX. W | MAIN W | AUX. W | MAIN W | AUX. W |
|  | 8 TO 11 |  | 38 TO 40 | 30 TO 31 | 8 TO 11 |
|  | 19 TO 16 |  | 39 TO 41 | 32 TO 33 | 19 TO 16 |
|  |  |  | 42 TO 44 | 34 TO 35 |  |

INVENTOR.-
LEONARD E. ASKE
BY William C. Babcock
ATTORNEY

Patented Oct. 5, 1954

2,691,124

UNITED STATES PATENT OFFICE 2,691,124

ELECTRIC MOTOR AND SWITCH

Leonard E. Aske, Minneapolis, Minn., assignor to General Mills, Inc., a corporation of Delaware Application March 12, 1949, Serial No. 81,137

8 Claims. (Cl. 318—220)

The present invention relates to electric motors and more particularly to an improved switch mechanism for such a motor.

Electric motors have been suggested in the past in which the stator is provided with a plurality of separate coil windings which are adapted for connection in different combinations to obtain different relative polarities and different motor operating characteristics. For example, it has been proposed to provide different sets of windings so that a given motor can operate as a two-pole or four-pole motor depending on the connections which are made between the various windings.

As far as I am aware, no one has provided a simple and compact mechanism for facilitating the change in connections to obtain the desired type of operation. In some cases the winding connections have been of a relatively permanent nature which required disassembly and reconnection by a skilled electrician. In other cases, the winding leads have been wired to a terminal box, but here again, the change in connections to obtain different operating characteristics has been time consuming, and has required a trained serviceman.

It is accordingly one object of the present invention to provide an electric motor with improved switch mechanism for selective connection of the motor windings in different combinations to obtain different operating characteristics.

A further object is to provide improved switch mechanism to which separate motor windings are connected for readily and selectively changing the relative polarity of the windings.

It is another object to provide a relatively simple and compact switch mechanism which may be formed and mounted as a part of the motor itself.

Another object is the provision of an improved method of assembly for such a combination motor and switch.

A further object is the provision of a selector switch for such a motor in which the switch members are mounted coaxially with the motor stator.

Still another object is the provision of a selector switch for such a motor in combination with a main switch which is automatically opened prior to operation of the selector switch to permit the use of relatively light selector switch contacts.

An additional object of the invention is the provision of a selector switch including two members relatively movable between at least two switch positions and in which the members have a plurality of contact stations, each of which is provided with groups of contacts spaced corresponding to the different switch positions.

A still further object is the provision of a selector switch with such contact stations in which the winding leads are connected in an improved arrangement at the various stations.

Other objects and advantages of the present invention will be apparent from the following specification in which a preferred embodiment of the invention is described.

In the drawings forming a part of this application and in which like reference characters indicate like parts.

Fig. 13 is a similar view showing one of the other sets of windings.

Figs. 15, 16, and 17 show the connections of the various windings for four-pole, two-pole, and eight-pole operation, respectively, and Fig. 18 indicates the permanent internal connections of the stator coils which are effective in the various circuits.

Motor construction

Figure 1:
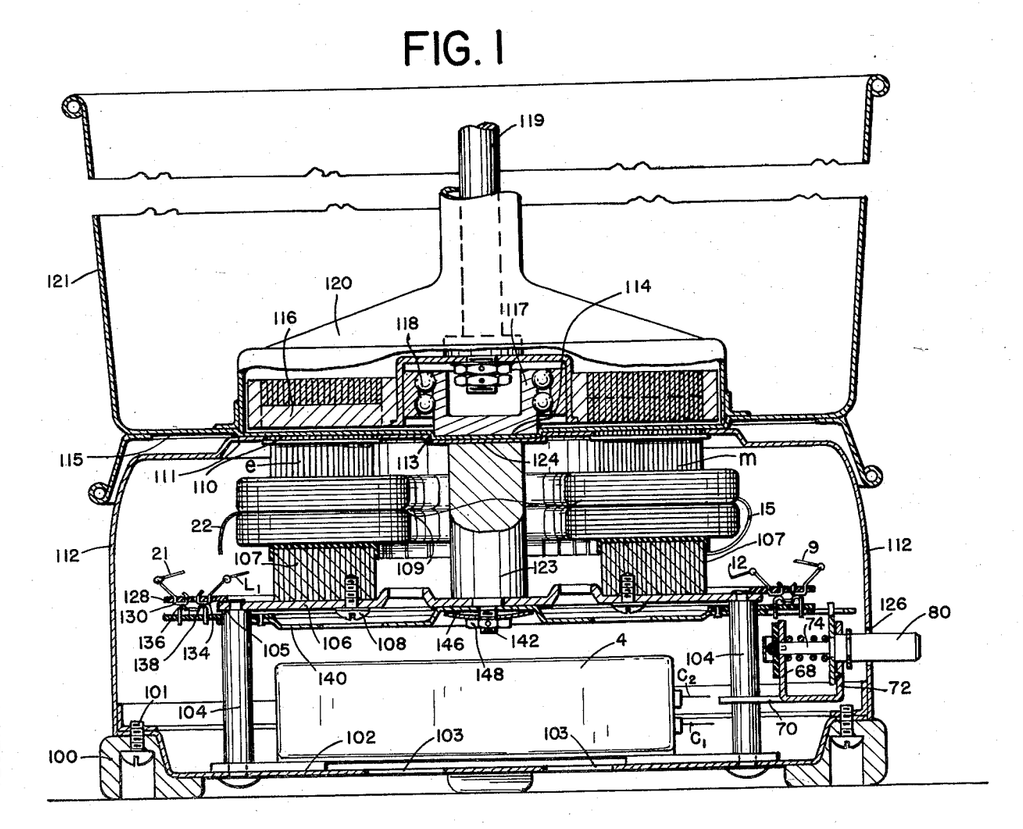
Figure 1 is a view partly in section of an electric motor and switch according to the present invention.

With reference to Fig. 1, one embodiment of the present invention has been illustrated in connection with an electric motor of the axial pole type. It will be understood that the present invention can be utilized in connection with other types of motors such as the more orthodox radial pole type and that the axis of the motor may be either vertical as shown in Fig. 1 or in any other desired relative position. I prefer to use an induction motor with auxiliary windings and capacitor, as described below, although the invention is also useful in other induction motors such as shaded pole motors or other types in which a change in relative polarity of various windings can selectively determine the motor operating characteristics.

The motor is mounted on a suitable base 100 which in this case consists of an annular ring of plastic material. A bottom plate 102 is mounted on base 100 by means of bolts 101. The bottom plate 102 includes suitable ventilation openings 103.

A series of supporting posts 104 is provided, with the posts spaced around a circle having its center at the center of bottom plate 102. Posts 104 serve to support the motor stator and switch mechanism.

The top of each supporting post 104 is provided with a shoulder 105 on which the main stator supporting plate 106 is mounted. Plate 106 in turn supports the stator laminations 107 which are firmly connected to the support by bolts 108. The stator laminations 107 in the present case are in the form of an annular ring, the upper portion of which is divided into 16 poles by means of slots, two of which, e and m, are shown. Stator coil windings 109 are located in the slots. In the present case the motor includes a plurality of these separate coil windings 109 which can be connected in different combinations to obtain different relative polarities and, as a result, different motor operating characteristics. The specific location, arrangement and connection of these coils will be described below.

The individual stator poles include horizontal pole faces 110 which project through openings in a flat top plate 111 of the motor. Plate 111 includes an integral cylindrical peripheral portion or skirt 112 which extends downwardly and is connected to base 100 to form a complete enclosure for the stator and switch parts.

The cover plate 111 is provided with a central, non-circular depression 113 into which a corresponding central depression 114 on the bottom 115 of a receptacle 121 may fit.

An axial pole or disk type rotor 116 is rotatably mounted on a central hub 117 by means of bearings 118. Hub 117 in turn is supported in the central depressed portion 114 of receptacle bottom 115.

Rotor 116 carries a vertical shaft 119 which extends from a suitable rotor housing 120 for connection to any desired apparatus. For example, shaft 119 may be utilized to drive a pump or a mixer designed to operate on the contents of the receptacle 121. Since such a pump or mixer forms no part of the present invention, it need not be shown or described further.

In any event, it is clear that in the illustrated construction the receptacle 121 with rotor 116 and shaft 119 may be lifted readily from the top plate 111 of the stator base. It will be equally apparent that when the receptacle is in position as shown in Fig. 1, the rotor 116 and stator pole faces 110 will cooperate to drive shaft 119 in a manner determined by the characteristics and connections of the individual coil windings 109. For many purposes the rotor need not be removably mounted but can be supported by the same frame members which carry the stator parts.

To assist in supporting the weight of the rotor and its supporting hub 117, a central post 123 is mounted as a spacer between the center of stator supporting plate 106 and the portion 113 of the cover plate 111. Thus the upper surface 124 of post 123 supports portion 113 and thereby in turn supports hub 117 and rotor 116.

Selector switch mechanism

In order to connect the various coil windings 109 in the desired different combinations, I have provided a selector switch. While this switch may take various forms, I have shown by way of example, two relatively movable members 128 and 138 which in this case are in the form of annular plates of insulating material provided with suitable slots. In the preferred embodiment shown, one member or plate 128 is fixed to the outer edge of the stator supporting plate 106. Member 128 has a series of slots 129 in which are mounted parallel rows of primary contacts 130 and 134. In the preferred form of the invention, these contacts 130 and 134 are arranged in pairs with the two contacts of each pair radially aligned with respect to the stator axis and with the various pairs spaced circumferentially around the switch member 128. Thus contacts 130 and 134 are immediately adjacent the stator coils for direct connection of the latter to the switch and the elimination of long and complicated leads. Thus member 128 serves, in effect, as a terminal strip for the various winding leads.

The other switch member 138 is movably mounted with respect to member 128 and in this case is specifically mounted for rotation about the stator axis. Thus plate 138 is carried by a disk 140 which is pivotally supported on the depending threaded portion 142 of center post 123. A spring washer 146 and nut 148 retain the disk 140 and switch member 138 immediately adjacent the stator supporting plate 106 and upper switch member 128, and at the same time permit rotation of disk 140 and member 138 with respect to the other parts.

Figure 11:
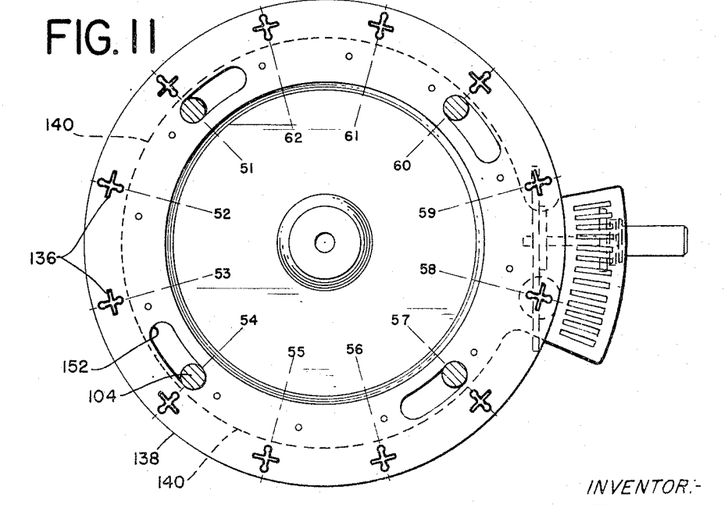
Fig. 11 is a similar view of the other switch member showing the arrangement of the bridging contacts on said member.

As shown in Fig. 11, lower switch plate 138 has a series of circumferential slots 152 which are aligned with similar slots in the central supporting disk 140. These slots engage the supporting posts 104 of the stator base and thus serve to guide the rotation of switch member 138 about the central threaded portion 142 of post 123.

Figures 2, 3, 4, 5, 6, 7, 8, 9:
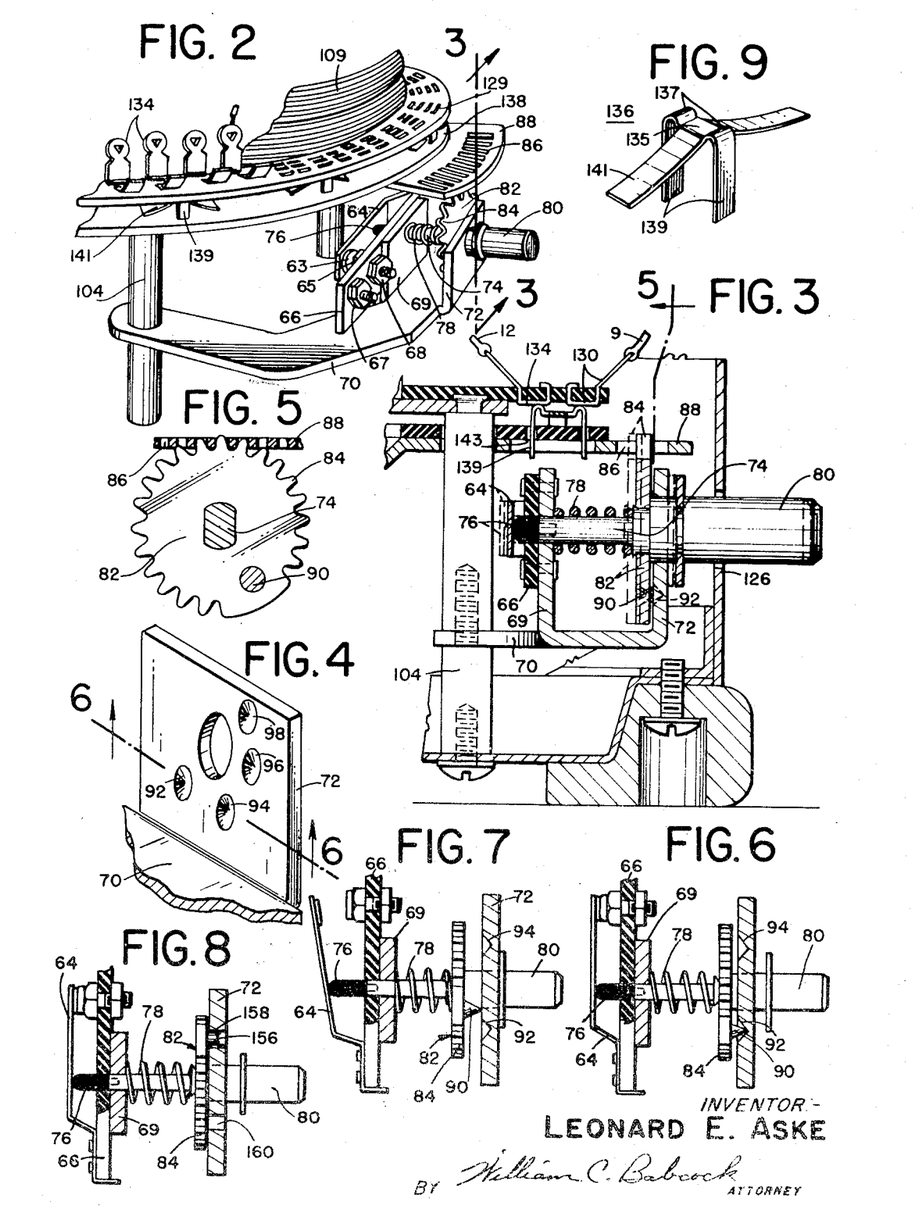
Fig. 2 is a partial perspective view of the switch mechanism of Fig. 1.
Fig. 3 is a partial sectional view along the line 3—3 of Fig. 2.
Fig. 4 is a partial perspective view of one of the supports for the switch operating mechanism.
Fig. 5 is a partial sectional view on the line 5 of Fig. 3.
Fig. 6 is a partial sectional view of the device of Fig. 3 taken on a line indicated as 6—6 in Fig. 4.
Fig. 7 is a view similar to Fig. 6 but showing the operation of the parts as the selector switch is adjusted.
Fig. 8 is a view similar to Fig. 6 of an alternate embodiment of one portion of the switch operating mechanism.
Fig. 9 is a perspective view of one of the bridging contacts of the switch mechanism.

Movable switch member 138 is provided with slots 143 (Fig. 3) in which the supporting legs of a bridging contact 136 may be removably engaged. Bridging contact 136, as shown in Fig. 9, includes two contact portions 137 which are spaced in radial alignment on switch member 138. Thus the contact portions 137 are spaced transversely of the path or direction of relative movement between the plates 128 and 138, since such path of relative movement is in this case circumferential. Contact portions 137 are joined by an integral bridging portion 135 and are spaced apart a distance corresponding to the spacing of the contacts 130 and 134 on the lower surface of the upper switch member 128. Thus the contact portions 137 and the bridging portion 135 are effective to connect electrically the members of a given pair of primary contacts 130 and 134, whenever the bridging contact 136 is moved into alignment with the desired pair of primary contacts.

Bridging contact 136 has two integral depending legs 139, one of which extends downwardly beneath each contact portion 137. These legs 139 are designed for removable engagement with the slots 143 of switch member 138.

The cooperating or bridging contact 136 also has one or more (in this case, two) integral spring arms 141 extending downwardly and transversely of the bridging portion 135. These spring arms 141 are adapted for engagement with the upper surface of switch member 138 and thus urge the cooperating contact 136 upwardly out of the slots so that contact portions 137 are held firmly against the desired pair of primary contacts on the upper switch member 128. This construction of the cooperating contacts accordingly maintains the necessary contact pressure regardless of minor variations in the spacing of switch plates 128 and 138 from point to point around their peripheries.

The operating means for the selector switch is illustrated in Figs. 2 to 8, inclusive. The rotatable supporting disk 140 for the movable switch member 138 is provided with an extension in the form of a sector 88 as shown in Fig. 2. Extension 88 is provided with a series of radial slots 86 spaced for cooperation with the teeth 84 of a rotatable gear 82. Gear 82 is fixed to a rotating shaft which includes an extending portion 80 for manual operation. Thus by rotation of knob 80, the gear 82 will be rotated and through engagement of the gear teeth 84 with slots 86, the sector 88 and lower switch members 140 and 138 will be similarly rotated from one to the other of the desired operating positions of the switch.

Figure 10:
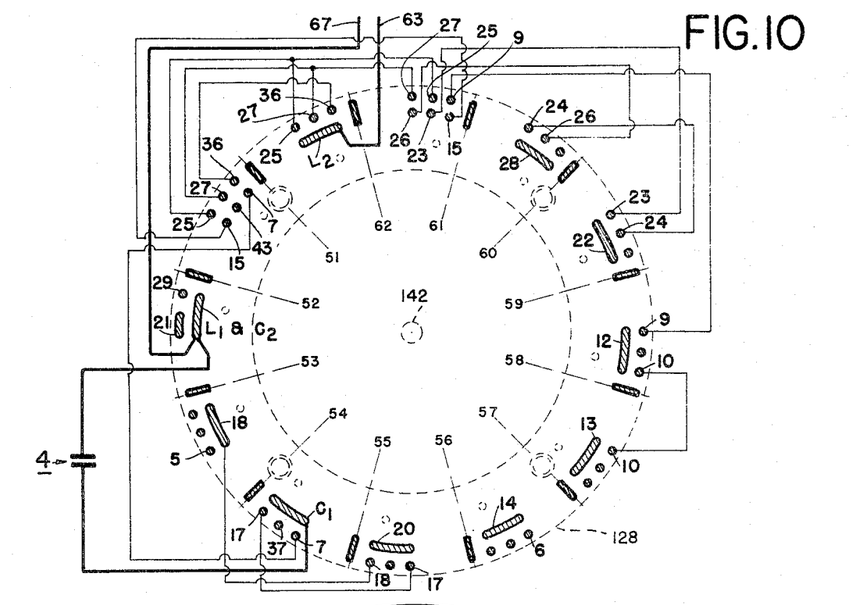
Fig. 10 is a schematic view showing the arrangement of the contact stations on one of these selector switch members.

One arrangement of the respective primary and cooperating contacts on members 128 and 138 is illustrated in Figs. 10 and 11. In Fig. 10, which is a schematic view looking downwardly on the upper switch member 128, the arrangement of the primary contacts is shown. These contacts are arranged in a plurality of contact stations. These contact stations are indicated by the dotted radial lines numbered 51 to 62, inclusive, and include the various contacts located on the counterclockwise side of each line.

In Fig. 11, a similar schematic view of the lower switch member 138 indicates that such member includes a bridging or cooperating contact 136 for each of the contact stations 51 through 62. In the present instance it is assumed that the switch members 128 and 138 are in the relative positions shown in Figs. 10 and 11 with the bridging contacts of the movable member 138 in alignment with the corresponding station numbers of the upper plate 128. From this position, the lower switch member 138 is movable to a plurality of different motor operating positions which are spaced in succession in a counterclockwise direction from the starting or off position indicated by the numerals 51 to 62.

With reference to station 51, for example, there are six primary contacts some of which are spaced radially or transversely of the direction of relative movement of the two switch members and some of which are spaced circumferentially along said path of relative movement. Thus successive counterclockwise rotation of the switch plate 138 and the bridging contact corresponding to station 51 will move the bridging contact from the neutral position in alignment with numeral 51 of Fig. 10 to a first motor operating position in which the bridging contact will engage the primary contacts 7 and 36 and will thus complete a circuit between them.

In the next or second operating position of the switch the bridging contact for station 51 will again be moved counterclockwise until it is in engagement with the contacts 27 and 43 and thus completes the circuit between them. At the same time it will be apparent that the original circuit between contacts 7 and 36 will be broken.

Finally, in the third operating or running position of the switch, the bridging contact of station 51 will be moved farther in a counterclockwise direction until it engages the contacts 15 and 25. Thus a circuit will be completed between these contacts while the previous connection between contacts 27 and 43 will be broken.

The bridging contacts at each of the other contact stations are effective in a similar manner to establish connections between different primary contacts in the different positions of the switch. In some cases, as shown for example at station 52, a number of the primary contacts may be connected together, or in other words, connected to the same circuit lead. Thus at station 52, three of the contacts corresponding to the three different operating positions of the switch are all connected together as indicated at $L_1$. Similarly, two of the remaining contacts corresponding to the second and third operating positions of the switch are connected together as indicated at 21.

In this connection, the designation $L_1$ is used to indicate that the three first-mentioned contacts are connected directly to one of the supply lines for connection through a suitable main switch to a source of current. The supply lines are designated by the symbols $L_1$ and $L_2$ in the wiring diagram of Fig. 10. The contacts 29 and 21 of station 52 are connected to specific stator coil windings as described in a subsequent portion of this specification. At the moment it might also be noted that the second supply line $L_2$ is connected at station 62 to three of the primary contacts corresponding to three different operating positions of the switch. It will be further noted from Fig. 10 that a condenser or capacitor 4 (also shown in Fig. 1) has one of its terminals connected at station 52 to a plurality of primary contacts corresponding to different switch positions, e. g., in this case, to the same three primary contacts to which supply line $L_1$ is connected. The other terminal of condenser 4 is similarly connected at station 54 to a plurality of contacts, e. g., in this case to contacts corresponding to each of the three operating positions of the switch as indicated at $C_1$.

The various leads from the motor windings, which are designated by the numerals 5 through 44 and are described in detail below, are connected to other primary contacts at the various stations in the manner illustrated. It should be noted that in accordance with this invention, certain of these leads are connected at one station to a primary contact corresponding to one operating switch position and also connected at a second station to a primary contact corresponding to a different switch position. For example, at station 51 the winding lead designated as 7 is connected to a primary contact corresponding to the first operating position of the switch. It will be clear from Fig. 10 that lead 7 is also connected at station 54 to a primary contact corresponding to the third operating position of the switch.

It will also be noted that in certain cases one of the motor winding leads is connected at a given station to a plurality of primary contacts corresponding to different switch positions. For example, at station 55, the lead 20 is connected to primary contacts corresponding to each of the three operating positions of the switch. At the same time, leads 17 and 18 are connected to remaining contacts at this station. As shown below, leads 17 and 18 are from opposite ends of the same coil winding. Thus the arrangement of station 55 permits selective connection of lead 20 to either of coil leads 17 or 18, depending on the particular switch position. As a result, the relative polarity of the two windings can be changed by movement of the switch so that the polarities are alike or unlike, as may be required for a particular motor operating characteristic.

The use of contacts corresponding to different operating switch positions, the arrangement of such contacts at a plurality of contact stations, and the connection of the various leads at the different stations in accordance with one or more of the arrangements described above makes it possible to accomplish the objects of the present invention and obtain different relative polarities and different motor operating characteristics corresponding to each operating position of the switch, with a relatively simple structure.

At the same time, it is possible to use relatively light and inexpensive materials for the various contacts on members 128 and 138 when the selector switch is operatively associated with a main switch in the manner to be described.

Main switch mechanism

The main switch for interrupting all application of current to the motor windings and selector switch contacts includes a pair of cooperating main switch contacts 63 and 65 (Fig. 2). Main switch contact 63 is carried on a spring arm 64 mounted on an insulating plate 66. Contact 65 is directly and fixedly mounted on insulating plate 66 and includes a portion extending through plate 66 to serve as a terminal 68 for connection to a source of electric current. A separate terminal 67 on the insulating plate 66 serves as the other line connection for the current source. Thus the usual electric supply cord will be connected to the two terminals 67 and 68. Terminal 67 in turn is also connected directly to supply line L₁ and the corresponding primary contacts of station 52, as described above. The other supply line L₂ and its contacts are connected to the movable main switch contact 63. Thus whenever the main switch contacts 63 and 65 are in engagement a circuit will be completed from line terminal 68 to supply line L₂ to the desired primary contacts and coil windings.

Insulating plate 66 is mounted on an upwardly extending bearing flange 69 of switch support 70. Support 70 in turn is mounted on two of the stator supporting posts 104.

Switch support 70 also includes another upturned bearing flange 72 which is parallel to and spaced from the bearing flange 69. Flanges 69 and 72 and switch plate 66 are provided with aligned openings in which the switch operating shaft 74 is rotatably and slidably mounted. Shaft 74 has an insulated tip 76 which engages directly against the supporting blade 64 of main switch contact 63. Thus as shaft 74 is moved axially to the left in Figs. 2 and 3, the contact arm 64 will be moved so that main switch contacts 63 and 65 are separated and the circuit is broken.

Shaft 74 is the same shaft which carries the knob 80 and gear 82 previously described for operation of the selector switch. A spring 78 on shaft 74 is interposed between bearing flange 69 and gear 82 and thus urges the gear and shaft 74 to the right or to the position in which the main switch contacts 63 and 65 will remain closed.

From the above description it will be apparent that rotation of operating knob 80 (which extends outwardly through an opening 126 in the skirt portion 112 of the stator cover) will be effective to move the selector switch from one operating position to another. At the same time axial movement of knob 80 against the force of spring 78, will be effective to move main switch blade 64 and open the main switch contacts to break the circuit.

As indicated above, I have provided means in connection with this operating mechanism to insure that the main switch is opened before the selector switch is moved and to insure that the main switch remains open throughout the adjustment of the selector switch. One means by which this interlocking connection can be achieved is shown in Figs. 3 to 7, inclusive. In this case, the gear 82 is provided with a conical projection 90 extending toward the supporting bracket 72. Supporting bracket 72 in turn has four recesses or depressions 92, 94, 96, and 98 in any one of which the projection 90 of gear 82 may be received. When projection 90 is in engagement with one of these depressions, the gear and shaft 74 will be far enough to the right in the figures so that the main switch contacts remain closed as indicated in Fig. 6. However, to rotate the gear 82 and change the adjustment of the selector switch, it is necessary to push the shaft 74 to the left so that the projection 90 moves out of one particular recess and rides along the inner surface of supporting bracket 72 as shown in Fig. 7 on its way to the next recess. In this figure, the shaft has been moved to the left against the resilience of spring 78. The depth of the projection and recesses is so adjusted that when the projection moves out of a given recess, the shaft 74 will be moved sufficiently to the left to open the main switch contacts 63 and 65. By sloping the surfaces of the projection 90 and recesses 92, 94, 96 and 98, a cam action can be obtained so that it is unnecessary for the operator to think consciously of pushing the operating knob 80 inwardly. It is only necessary for the operator to rotate the knob 80 to the desired switch position and as a result of the rotation, the conical surfaces of the projection and recesses will automatically force the shaft 74 axially so that the switch is opened before the selector switch is moved and is closed after the selector switch contacts are fully engaged in their new position.

Thus, the switch, which was originally in the neutral position corresponding to Figs. 10 and 11 may be moved to any one of the three operating positions by rotation of knob 80 and the circuit will in all cases be broken at the main switch only. As a result there is no current flowing through the primary contacts or cooperating bridging contacts of the selector switch at the times when the selector switch is adjusted from one position to another. It is therefore unnecessary to provide contacts on the selector switch which will resist arcing. Instead, only the main switch contacts 63 and 65 need be designed to resist the normal electrical wear involved in the making and breaking of heavy currents in the motor circuit.

In connection with Fig. 4, it will be noted that the four recesses 92, 94, 96, and 98 correspond respectively to the off position of the selector switch and to the first, second, and third operating positions thereof.

In Fig. 8, an alternate embodiment of the interlocking mechanism between the main switch and selector switch is shown. In this case, the gear 82 which operates the selector switch is provided with a straight cylindrical projection 156 which is adapted to extend all the way through switch supporting bracket 72 which includes a series of openings 158, 160, etc., for this purpose. In all other respects, the parts are the same as in the previous embodiment. Thus, in this particular arrangement of Fig. 8, there will be no automatic camming action as the knob 80 is rotated. Instead, it will be necessary first to depress knob 80 until projection 156 clears the inner surface of bracket 72. In this position the main switch will be opened. It will then be possible to rotate knob 80 to the desired operating position of the selector switch, at which point the projection 156 will again be permitted to pass through one of the openings in bracket 72 so that the main switch can be closed after the selector switch is in position.

*Arrangement of windings and switch connections*

Figure 12:
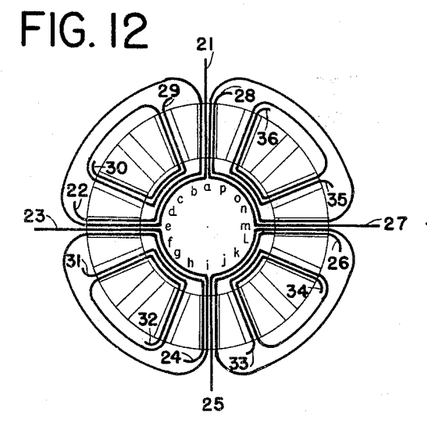
Fig. 12 is a schematic view showing the arrangement and location of certain of the windings of the motor stator.
Figures 13, 15, 16, 17, 18:
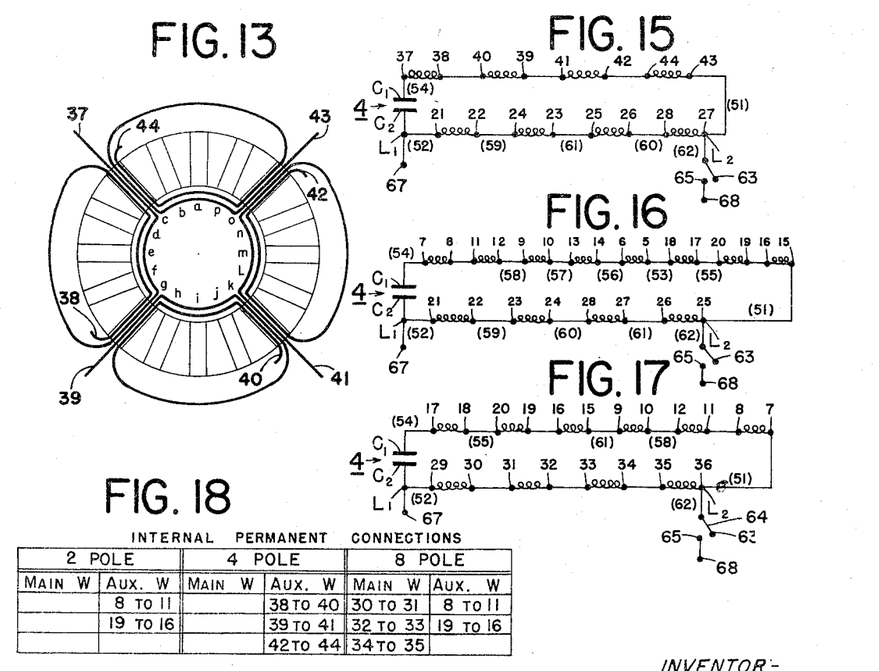
Figure 14:
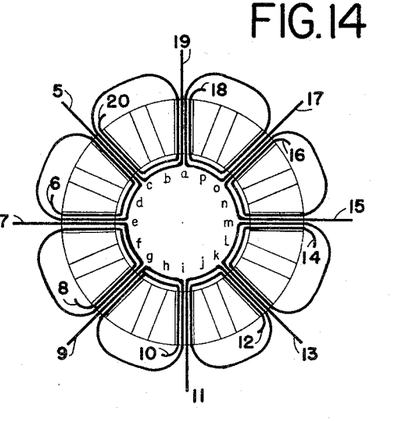
Fig. 14 is a similar view showing a third set of the motor windings.

In Figs. 12, 13, and 14, I have shown the various windings required for selective operation of the motor as a two-pole, four-pole, and eight-pole motor. Figs. 15 to 18, inclusive, indicate how the various coils are combined for the desired operations. In Figs. 12 to 14, the 16 stator slots have been lettered from *a* to *p*, inclusive, in order that the relative orientation of the windings will be clear. In Fig. 12, for example, two sets of windings are shown. The first set includes four coils indicated as 21—22, 23—24, 25—26, and 27—28. These four coils serve as the main windings for four-pole motor operation when connected in the manner indicated in Fig. 15. The same four coils also serve as the main windings for two-pole motor operation when connected in different order for different relative polarities as shown in Fig. 16.

The other set of windings, shown in Fig. 12, includes four smaller coils designated as 29—30, 31—32, 33—34, and 35—36. Whereas each of the four main windings or coils embraces four of the 16 stator poles, the windings of this second group each embrace only two poles, specifically the two poles at the center of each group of four poles embraced by the larger coil windings. These smaller coils are designed to serve as the main windings when the motor is operated as an eight-pole motor, the four small coils being connected in that case for so-called "consequent pole" operation, as shown in Fig. 17.

In Fig. 13 another set of windings is shown which is designed to serve as the set of auxiliary windings for four-pole operation of the motor. These windings, designated as 37—38, 39—40, 41—42, and 43—44 are similar to the four-pole main windings in that each winding embraces four of the 16 stator sections. The auxiliary windings of Fig. 13, however, are displaced 45° from the four-pole main windings of Fig. 12 as clearly indicated by the lettering of the slots. Thus the main and auxiliary windings are angularly displaced in the usual manner. The coils of Fig. 13 are connected in circuit for four-pole operation of the motor as shown in Fig. 15. Since these particular windings are not used in two-pole or eight-pole operation of the motor, they may be connected to each other by internal permanent connections as indicated by the table of Fig. 18 and as shown diagrammatically in Fig. 15. Similar internal permanent connections are utilized between the four small coils of Fig. 12 constituting the main windings for eight-pole operation, as also shown in Figs. 17 and 18.

Finally, in Fig. 14 another set of windings is shown which includes eight coils, each of which embraces two of the stator pole sections. These eight coils are designated by the numbers 5—6, 7—8, 9—10, 11—12, 13—14, 15—16, 17—18, and 19—20. Depending upon the particular connections used, these eight windings are used as the auxiliary windings for either two-pole operation, as shown in Fig. 16, or eight-pole operation, as shown in Fig. 17. Also, as indicated in Fig. 18, the connections at two points in these auxiliary windings are permanent and thus do not involve the selector switch contacts.

The same numerals, 5 to 44, inclusive, which have been used in Figs. 12 to 14 to indicate the ends or leads of the respective coil windings, have likewise been used in Fig. 10 to show one manner in which the leads may be connected to the various primary contacts of the selector switch to obtain the different circuits of Figs. 15 to 17, inclusive. In these latter figures, numerals in parentheses have been utilized to indicate the particular contact station of Fig. 10 at which the connections in question are made.

It will be apparent that when the selector switch is in the first operating position previously described the coil windings will be connected as indicated in Fig. 17 for eight-pole operation. Similarly, when the selector switch is in its second operating position so that the bridging contacts 36 complete the circuit between the members of the second pair of primary contacts at each station, the coil windings will be connected in the manner shown in Fig. 15 for four-pole operation of the motor. Finally, when the selector switch is in its third operating position, the motor windings will be connected as indicated in Fig. 16 for two-pole operation. Thus, with current of a given frequency, as, for example, 60 cycle 110 volt alternating current, the speed of the motor will gradually increase as the selector switch is moved from its first to its second and third operating positions.

While a single loop has been used for each winding in Figs. 12-14, it is understood that any desired number of turns can be included in a given winding.

The particular arrangement of the coil connections at the various contact stations is clearly shown in Fig. 10. A comparison of Figures 15 and 16 will show that this arrangement provides for selective connection of main windings 21—22, 23—24, 25—26, and 27—28 in different order to obtain different relative polarities for the desired operating characteristics. In this case the selective connections include contacts at stations 59, 60, and 61.

A similar comparison of Figures 16 and 17 indicates that the arrangement of contacts at stations 53, 55, 56, 57, 58 and 61 provides for changes in the relative polarities of certain of the auxiliary windings 5—6, 7—8, 9—10, 11—12, 13—14, 15—16, 17—18 and 19—20.

While the improved motor switch combination described above is directed primarily to changes in relative polarity for selective two-pole, four-pole, or eight-pole operation, certain of the features described may be used in any motor combination in which selective changes in the relative polarities of two or more coil windings are desirable. Certain of these features are also useful in any motor in which the methods of assembly described below are to be employed.

Method of assembly

The arrangement and combination of parts described above lends itself to a new and improved method of assembly for such a motor and switch combination. In the past it has been necessary either to wind the various coils for the different stator poles directly in place on the stator in a single operation or to wind the complete set of coils as a separate unit which is thereafter placed in the stator slots. In the first case, the winding operation is difficult and requires complicated mechanism. In the second case, the same considerations apply. Furthermore, in both of these cases it is impossible to test the coil windings until they are all in position. Should the testing procedure indicate a short circuit, the problem of tracing the connections to locate the defective coil portion is difficult and time consuming.

In the present case, on the other hand, I provide an entirely different method for assembly of the parts. According to this method a stator and switch member are placed in close or juxtaposed relationship. Coils for the different stator poles are wound separately as individual units. These separate coils are then positioned on the stator one at a time. As each such coil is placed in its proper position, the ends of the coil are connected to selected contacts of the switch before any of the remaining coils are positioned on the stator. Thus it is possible to test each coil through its switch contacts immediately after the coil has been mounted on the stator in its complete operative relationship. As a result, should a defective coil be encountered in the testing procedure, this coil, which was the last one placed in position, can readily be removed and replaced by a satisfactory coil, without the necessity of tracing the circuit connections to locate the defective coil or of removing other portions of the coils to permit the substitution.

The present process is further simplified since the operator assembling the stator coils can be provided with working diagram similar to those of Figures 10 and 12 to 14 which show the exact position of each coil in the slots and the specific switch contacts to which the leads of the particular coil are to be connected.

In this method of assembly certain of the coils will have one lead which is to be connected to switch contacts corresponding to different operating positions of the switch. According to this process such leads will be connected to all of these desired switch contacts before the remaining coil windings are placed in position, in order that the coil may be tested immediately through both sets of contacts. Thus the operator can be assured that the coil and all of its respective connections are fully operative before further coils are mounted on the stator.

According to the foregoing description an electric motor has been provided which accomplishes the objectives previously set forth. The motor includes a plurality of different coil windings for selective connection in different combinations to obtain different relative polarities and motor operating characteristics. This connection in the various combinations is achieved by a new and simple selector switch in which leads are connected from the coil windings and motor condenser to the selector switch contacts in one of the specific manners previously outlined. An improved process has been provided for construction and connection of such a combination motor and switch. The provision of selector switch members with a plurality of contact stations, the location of the switch members immediately adjacent the motor stator so that short and relatively easily connected leads may be employed, and the interconnection of the selector switch and main switch so that the selector switch contacts are not subjected to the wear involved in making and breaking the circuit, all contribute to an improved electric motor and switch combination which is capable of a wide variety of uses and which meets the objectives outlined at the beginning of this specification.

Since minor variations and changes in the exact details of construction will be apparent to persons skilled in this field, it is intended that this invention shall cover all such changes and modifications as fall within the spirit and scope of the attached claims.

Now, therefore, I claim:

1. In an electric motor with a stator having a plurality of separate coil windings, the combination comprising a selector switch for selective connection of the windings in different combinations for different motor operating characteristics, the selector switch including two members relatively movable along a predetermined path between at least two switch positions, the members having a plurality of contact stations, with each station having a group of pairs of primary contacts on one member with the contacts of each pair spaced transversely of said path and with the respective pairs spaced along the path corresponding to the different switch positions, and cooperating contacts on the other member engaging and connecting different pairs of primary contacts of the group in the different switch positions, the cooperating contacts consisting of metallic clips each having a contact strip bridging a given pair of primary contacts and having supporting legs engaging slots in said one member and an integral spring arm urging the bridging portion away from said one member and against the pair of primary contacts.

2. A switch comprising two members relatively movable between at least two switch positions, pairs of contacts on one member corresponding to the different switch positions, and a cooperating contact on the other member for bridging the contacts of a desired pair in one of the switch positions, the cooperating contact including a bridging strip with contact portions at each end, a supporting leg depending from each contact portion, and a spring arm extending from the bridging portion, said other member having slots in which the supporting legs of the cooperating contact are removably engaged, and the spring arm bearing against said other member to urge the contact portions away from the member and toward the desired pair of contacts.

3. An electric motor comprising a stator having a plurality of separate coil windings annularly arranged about an axis, a selector switch for selective connection of the windings in different combinations for different motor operating characteristics, the selector switch including two members relatively movable about said winding axis between at least two switch positions, one of the members having a group of primary contacts positioned substantially adjacent the coils for ease of connecting the coil leads some of which are spaced radially and some of which are spaced circumferentially of the axis and the other member having a cooperating contact engaging and connecting different primary contacts of the group in the different switch positions, and leads from the windings connected to the contacts.

4. An electric motor comprising a stator having a plurality of separate coil windings arranged around the rotor, a selector switch for selective connection of the windings in different combinations for different motor operating characteristics, the selector switch including two members relatively movable along a predetermined path coaxial with the stator windings between at least two switch positions, pairs of primary contacts on one of the members with the contacts of each pair spaced transversely of said path and with the respective pairs spaced along the path corresponding to the different switch positions, the contacts being arranged substantially adjacent the windings for ease of connection, the other member having a cooperating bridging contact engaging and connecting a given pair of primary contacts in one switch position and a different pair of primary contacts in the other switch position, and leads from the windings connected to the primary contacts.

5. An electric motor comprising a rotor rotating about an axis and a stator having a plurality of separate coil windings, a selector switch for selective connection with the windings in different combinations for different motor operating characteristics, the selector switch including two members coaxially positioned with respect to said rotor axis and being relatively movable between at least two switch positions, the members having a plurality of contact stations with each station having a group of primary contacts on one member spaced corresponding to the different switch positions and a cooperating contact on the other member engaging different primary contacts of the group in different switch positions, and leads from the windings connected to the primary contacts with certain leads connected to certain primary contacts and other leads connected to other primary contacts so that certain windings will be in circuit at different switch positions.

6. An electric motor in accordance with claim 3 including a capacitor having leads connected to certain primary contacts, the contacts selected so that said cooperating contact will connect the capacitor to other terminals connected to windings to cause the motor to operate as a capacitor motor in at least one switch position.

7. An electric motor in accordance with claim 4 in which the leads from one winding are connected to primary contacts corresponding to both of said switch positions so that the same winding will be used in both of the winding combinations of the two switch positions.

8. An electric motor in accordance with claim 5 including a capacitor having leads connected to primary contacts, the leads connected to primary contacts corresponding to at least two switch positions, the contacts selected so that the capacitor will be connected to windings in more than one switch position to cause the motor to operate as a capacitor motor in the corresponding switch positions.

References Cited in the file of this patent

UNITED STATES PATENTS

| Number | Name | Date |
|---|---|---|
| 819,563 | Linn | May 1, 1906 |
| 851,662 | Jackson | Apr. 30, 1907 |
| 854,831 | Mershon | May 28, 1907 |
| 882,606 | Alexanderson | May 24, 1908 |
| 1,305,268 | Evans | June 3, 1919 |
| 1,363,813 | Raney | Dec. 28, 1920 |
| 1,366,580 | Martin | Jan. 25, 1921 |
| 1,420,773 | Stainbrook | June 27, 1922 |
| 1,495,420 | Lewis | May 27, 1924 |
| 1,905,735 | Morrill | Apr. 25, 1933 |
| 1,983,741 | Dedrick | Dec. 11, 1934 |
| 1,996,571 | Dedrick | Apr. 2, 1935 |
| 2,422,906 | Johnson | June 24, 1947 |
| 2,465,086 | Grossen | June 22, 1949 |

FOREIGN PATENTS

| Number | Country | Date |
|---|---|---|
| 386,512 | Great Britain | Jan. 19, 1933 |